United States Patent

[11] 3,615,656

| [72] | Inventor | Don Edward Alden |
| | | Park Forest, Ill. |
| [21] | Appl. No. | 711,538 |
| [22] | Filed | Mar. 8, 1968 |
| [45] | Patented | Oct. 26, 1971 |
| [73] | Assignee | Swift & Company |
| | | Chicago, Ill. |

[54] PROCESS FOR THE PRODUCTION OF FLAVORED PROTEIN FOODS
4 Claims, No Drawings

[52] U.S. Cl. ........................................................ 99/17, 99/14
[51] Int. Cl. ....................................................... A23j 1/26
[50] Field of Search ........................................ 99/14, 17, 81, 82

[56] References Cited
UNITED STATES PATENTS

| 3,047,395 | 7/1962 | Rusoff et al. ................ | 99/14 |
| 3,175,909 | 3/1965 | Elmquist ....................... | 99/17 |
| 3,269,841 | 8/1966 | Dechaine et al. ............. | 99/14 |
| 3,447,929 | 6/1969 | Hale .............................. | 99/7 |
| 3,488,197 | 1/1970 | Page et al. .................... | 99/17 |

Primary Examiner—Raymond N. Jones
Assistant Examiner—Roger B. Andewelt
Attorneys—Edward T. McCabe and Charles E. Bouton

ABSTRACT: Simulated and artificially flavored proteinaceous food products are prepared using an expanded protein material, by a critical sequence of steps wherein a solution of flavoring material is applied to the expanded material and thereby absorbed throughout the interstices thereof and a melted fat is also applied and dispersed throughout the protein structure whereafter the treated material is heated so as to combine the artificial flavoring and fat materials and to reduce the moisture content to a shelf stable level.

PROCESS FOR THE PRODUCTION OF FLAVORED PROTEIN FOODS

The present invention is directed to the product and process for producing an improved simulated and flavored protein food; and is particularly directed to the production of an improved simulated and flavored meat.

Vegetable protein products treated to simulate items of meat have been developed by the feed industry. Currently such products tend to fall into two categories. In one category the vegetable protein is extruded into filaments which are collected in tows and then assembled to simulate the fibrous structure of many meat items. Such products are often flavored by indiscriminately adding all flavoring ingredients, including fat or oil, into a slurry of binding agents that are then dispersed throughout the tows of fibers to adhere them one to the other. A detailed description of an illustrative process is found in the Hartman, U.S. Pat. No. 3,320,070.

The second category of simulated meat items utilizes an expanded vegetable protein structure that is obtained by forming a dough of vegetable protein and water; and then heating the dough under conditions that will cause the generation of steam therein to produce an expanded protein matrix having numerous small voids and crevices. Such products and their process of manufacture are disclosed in the U.S. Pats. to McAnelly No. 3,142,571 and to Rusoff No. 3,047,395. According to those procedures a vegetable protein dough is heated in an autoclave or the like to produce an expanded cellular structure. Another technique for producing a similar type product is disclosed in British published specification No. 1,049,848 wherein it is taught that a vegetable protein dough can be extruded under conditions that will tend to orient a cellular structure. The techniques for flavoring products of this type has been to either include the flavoring ingredients in the raw dough (as is taught in the British specification) or to coat the exterior of particles of the product with a suspension of flavoring ingredients.

While a number of vegetable protein materials are known to be suitable for use in the foregoing practices, soybean materials have been preferred. The present invention is directed particularly to the production of an improved product of the second category type, preferably, but not necessarily, manufactured from soybean materials.

I have found that if the expanded protein material is flavored by coating the protein product after production, according to prior techniques, certain disadvantages are incurred. Usually, such product will be found lacking in organoleptic value as the flavor on the outer surface of the material quickly deteriorates with age and exposure to air. Also, the coating is subject to rapid dispersion either in the mouth, if eaten dry, or in the cooking medium if prepared prior to eating. In either case, a relatively bland or sometimes beany flavored protein matrix is left for the consumer to chew.

If the flavoring ingredients are included in the raw dough, the result is usually a product that provides little, or an inferior, organoleptic sensation to the consumer as the flavor values are locked into the protein structure or modified or lost through subsequent heating steps during processing thus making the resultant flavor less acceptable to the palate. These products tend to be very hard and dense and are not pleasant when eaten raw or without hydration. Also, it is very difficult to reproduce desired flavor balance as subsequent processing of the dough alters the flavors of the ingredients. A further disadvantage of including flavor ingredients in the raw protein dough is that the manufacturer is committed to one flavor for any batch of product. Which means that it is difficult to rapidly change production from one flavor to another; and it is not possible to manufacture small quantities of a particular flavor, but large inventors of all flavors must be maintained.

Accordingly, it is a principle object of the present invention to provide an improved product and process for manufacturing a flavored simulated protein food.

It is another object of the present invention to provide an improved product and method for preparing a simulated protein food wherein the flavor is added after the body of protein material is prepared.

It is still another object of the present invention to provide an improved product and process for producing a flavored expanded protein food material.

I have found that an unflavored substantially fat-free expanded soybean material can be successfully treated by first applying a solution of flavoring materials to the expanded protein structure, then applying a melted fat and finally heating the treated material to an internal temperature not exceeding about 180°F. The heating is continued for a time to reduce the moisture content of the material to a desired level that is also shelf stable bacteriologically. The material thus treated may then be advantageously exposed to a smoke treatment, or similar smoke flavor development may be obtained by including a small amount of a liquid smoke formula in the initial flavoring solution.

It is important that the flavor ingredients are applied in the form of a solution or mixture other than a suspension of the usual type as the latter would deposit the ingredients on the exterior surfaces of the protein material. When applied in solution form the flavoring ingredients penetrate virtually all of the cells and interstices of the expanded protein material to distribute the flavoring ingredients substantially uniformly throughout the structure of the material. It is also critical that the application of melted fat not precede the application of the flavor ingredients, for otherwise the latter solution would be hindered from reaching all cell surfaces and the fat would prevent absorption of the flavoring ingredients by the protein material. Under certain conditions some flavoring ingredients may be applied simultaneously with the melted fat insofar as such ingredients are selected to be fat soluble. Similarly, fat miscible colors may be applied simultaneously with the fat. However, for the production of simulated meat items, it is preferred that the flavor ingredients and fat be applied in two separate steps in the stated sequence.

Considering the present invention in greater detail, it has been found to be of primary benefit in the production of simulated food items, and particularly those items that are useful as foods in particular form such as crumbled bacon, diced or flaked ham and ground beef. However, the invention is also of benefit where simulating other protein food items such as nuts. If desired, the present invention can be utilized to impart nonprotein flavors, such as fruit flavors, to expanded protein material, so as to produce nutritious and delicious food items. There is precedent for such items as it is often customary to serve fruit with ham or pork dishes, or to cook meat items with fruit (e.g. ham with orange glaze); and the present invention can be utilized to impart flavors such as orange, strawberry, etc. to simulated meat particles.

Broadly considered, a very wide range of flavoring and coloring materials may be added to expanded protein particles from nearly any source, according to the present invention. Since the major criterion affecting the quantity of such additive materials is consumer preference for taste and color, it will be understood that such materials may be added in nearly any amounts limited essentially to a range from trace amounts to a maximum dependent upon what the structure of the protein material will accept. Respecting the latter I have found that expanded protein materials, according to their manufacture, may be hydrated with water in quantities ranging upwardly of 100 to 300 percent of the dry weight. The maximum amount of flavor and color ingredients thus can be the maximum amounts soluble in those quantities of water. However, lesser amounts of water are normally preferred as at maximum hydration the addition of fat becomes difficult if not impossible, and subsequent drying becomes lengthy and uneconomical.

Accordingly, it is usually found desirable to apply flavor and color ingredients in an aqueous solution amounting to from 20 to 150 percent of the weight of dry protein material to be treated where simulating meat and fruit flavored meat items. The solutions may include from about 3 to about 60 percent flavor and color ingredients, although it is preferred that the solution be nearly saturated; and it is usually intended to add a total of from 1 to 60 percent of such ingredients, by weight of the protein material, to the expanded protein. The solutions may comprise 0 to 40 percent sugars, 0 to 27 percent salt, 0 to 20 percent hydrolyzed vegetable protein, 0 to 3 percent citric acid, 0 to 3 percent ribotide (a flavor enhancer considered to be a mixture of 5'-nucleotides), coloring materials of about 1 percent or less, and 40 to 90 percent water.

In the case of preparing a simulated prefried and crumbled bacon product, it is preferred to start with a preprepared expanded soybean material in granule form wherein the protein strands and cell structure are oriented by extrusion. The production of such a material is taught in copending U.S. application Ser. No. 642,208, filed May 29, 1967. The granules are hydrated with a flavor solution by immersion for a period of 5 to 10 minutes. The flavoring solution may also be applied by spraying and the like, but the processing should continue until the granules absorb about 25 to 100 percent, by weight, preferably about 100 percent, of a solution containing approximately 10 to 60 percent, preferably about 30 percent, dissolved materials of which it is desired that salt not exceed about 11 percent. The dissolved flavoring ingredients will normally include salt, sucrose, hydrolyzed vegetable protein and a flavor enhancer such as ribotide. Optional ingredients are food acids and coloring ingredients such as caramel and FD&C Red Number 2 and FD&C Red Number 4. Other flavor ingredients may also be included such as "liquid smoke" ("liquid smoke" is a commercially available composition prepared by absorbing real smoke from hardwoods in an aqueous solution representing the spectrum of desirable smoke flavors) and various yeasts, smoked yeasts, vegetable extracts and spices.

Immediately after the granules have been treated with the flavoring solution, and while the granules are wet, they are treated with a melted fat by either immersion or spraying or the like, until approximately 5 to 60 percent by weight, based upon the initial dry basis of the granules, of the fat has been taken up in the granule cell structure. For simulating crumbled bacon, it is preferred that about 30 percent fat is added. The precise amount of fat to be included will again depend heavily upon individual preferences, but if the product is to be exposed to natural wood smoke, it will be found that at least 15 percent and preferably 30 percent fat should be present to develop a satisfactory smoked flavor. Also, it is preferred that the fat utilized for all products have a melting point within the range of 80°–110° F. and desirably close to normal body temperature. If the fat has a melting point in excess of 110° F. it will be found, upon eating, to have a tendency to coat the interior of the mouth, and is usually found undesirable.

Some products are benefited if a portion of the flavoring ingredients are added with the fat or oil component. For instance, where preparing fruit and nut flavored protein products, portions of the ingredients including sugar and citric acid may be introduced by aqueous solution and by direct admixture of dry powdered or granular forms to the protein material; whereas, desirable oil soluble fruit and nut flavors are first combined with the fat and then mixed with the protein.

In certain applications of the invention, it is satisfactory to introduce the coloring agent with the liquid fat. Some aluminum lake type colors are fat miscible and suitable for practicing the invention. Similarly, as previously mentioned, when preparing certain simulated food products such as nutmeats, including pecan and walnut, it is permissible to use fat soluble (which term is herein intended to include miscible) flavor ingredients directly in mixture with the liquid fat. Also, an oil soluble form of "liquid smoke" (prepared by liquid-liquid extraction into a vegetable oil from aqueous flavor solution) may be introduced with the fat component.

In all applications of the fat, it has been found that hydrogenated or partially hydrogenated vegetable oils are eminently satisfactory.

It is believed that when the flavoring ingredients and fat have been applied in the foregoing manner, the fat will combine upon subsequent heating with certain of the flavoring ingredients, such as hydrolyzed vegetable protein, carbohydrates and low molecular weight sugars, and with the naturally existing functional groups of the protein material to develop a flavor similar to the natural flavor of the fat component of the simulated item. Also, as mentioned, the fat serves as a vehicle for the smoke flavor agent where desired. It is also believed that the fat helps the particle or granule to retain a small percent of bound water and contributes to a desirable "mouth-fed." The retained water and mouth-feel contribute to superior palatability of the final product. Also the fat, where applied in this manner, usually improves the appearance of the product by enhancing the color and surface condition.

The granules, having been treated with flavoring solution and melted fat, are next heated to a temperature of at least about 120° F. and not exceeding about 180° F. This step is advantageously performed by spreading the granules on trays or continuous belts and exposing to heated air in a forced draft-type oven. The air temperature may be 200° F. or sometimes more. Evaporation of moisture from the granules will initially prevent the internal temperature from exceeding the imposed limit. The heating process is believed to cause certain combinations of fat and flavor ingredients, as previously mentioned, and is also believed to drive off certain undesireable flavor components often associated with soybean products. Furthermore, it will now be understood that by the disclosed sequence of treating steps it is possible to carefully regulate the heating of the product so as to enhance flavor development and completely avoid any flavor impairment.

Heating is continued until the moisture level of the product reaches a bacteriologically safe level. This is dependent in great part upon the salt and sugar level in the product and under certain conditions as much as 40 percent moisture may be retained. However, it is preferred that the product be dried to a final moisture content of between 1 and 10 percent by weight of the final product. The disclosed sequence of steps has also been found to improve resistance of the product to oxidative rancidity.

In the production of simulated bacon granules and many other simulated meat items, it is preferred for best taste development, but not necessary, to expose the treated and cooked granules to a final step of smoking in natural wood smoke of the same type that is commonly used to flavor natural meat products such as bacon, sausage and ham. Where desired, this step may be carried out under the same conditions with which natural meat products are treated. Similarly, artificial and so-called liquid smoke formulas may be applied for this purpose. If liquid smoke formulas are selected, they may be either applied by spraying a dilute solution on the finished granule, or preferably, by inclusion in either the aqueous flavor ingredient formula at the first step of the process or in the fat component.

The following examples will further illustrate the invention, however, it is to be understood that these examples are purely illustrative and are not to be considered in any way as a limitation on the scope of the invention.

EXAMPLE I

A small quantity of expanded granules of soybean protein that had been produced in accordance with the process disclosed in copending U.S. Pat. application Ser. No. 642,208, filed May 29, 1967 was obtained. (The process involves first forming a dough of roughly 85 to 65 percent of solvent defatted and ground soybeans and 15 to 35 percent water and then extruding same at about 100 p.s.i.g. and 260° to 380° F. through an extruder of the type disclosed in U.S. Pat. No. 3,117,006 manufactured by the Wenger Mixer Manufacturing Company, Sabetha, Kansas.) The granules were treated to simulate prefried and crumbled bacon. A batch of 667.5 grams of the granules, ranging in size between one-sixteenth inch and three-sixteenth inch was treated to simulate prefried and crumbled bacon by spraying with a flavor solution while being tumbled in a rotating drum. The flavor solution comprised the following ingredients dissolved in 445 grams of water:

| Caramel, Colored Powder | 3.8 grams |
|---|---|
| FD&C Red 02 Color | 0.1 gram |
| Salt | 83.3 grams |
| Sucrose | 54.5 grams |
| Hydrolyzed vegetable protein | 35.8 grams |
| Ribotide | 0.5 gram |

The entire quantity of 623.0 grams of the flavor solution was absorbed in a few seconds whereupon 283.5 grams of vegetable fat (hydrogenated to a melting point of 110° F.) heated to 160° F. was similarly sprayed on to the wet granules. The fat was evenly distributed by tumbling and was completely absorbed in a few seconds. Thereafter the treated granules were dried in a forced air oven at 190° F. (air temperature) until reaching a moisture content of about 6 percent. The dried granules were then distributed on a screen in a 1-inch deep layer and placed in a smoke oven and exposed to heavy natural wood smoke at 110° F. for a period of 45 minutes. The final product weighed 1159.6 grams.

The finished product by organoleptic analysis was more acceptable than prefried and crumbled bacon in appearance, taste and texture. Subsequent accelerated storage tests showed the product was bacteriologically stable, and stable against rancidity and flavor change. The latter tests indicate predictable canned shelf stability for a period of approximately ten years. The product was also readily hydratable and found to take up 150 percent of its weight in water in less than 5 minutes.

EXAMPLE II

Another batch of expanded soybean material produced in the same manner as for example I, but wherein the particles were substantially larger in size and were in the form of chips or slices ranging up to ½-inch maximum dimension, was obtained and treated to simulate ham. A quantity of 637.6 grams of the soybean material was treated to absorb 634.98 grams (99.5 percent by weight) of flavor and color solution of the following formula:

| FD&C Red 02 | 0.08 gram |
|---|---|
| Salt | 55.6 grams |
| Sugar | 67.0 grams |
| Ribotide | 0.4 gram |
| Hydrolyzed vegetable protein | 22.4 grams |
| Smoked hydrolyzed vegetable protein | 50.4 grams |
| Smoked yeast | 14.2 grams |
| Water | 424.5 grams |

Thereafter 286.2 grams of hydrogenated vegetable oil containing 1.1 ml. of liquid smoke was heated to 160° F. and added to the solution treated soybean material. Finally the treated material was dried in a stream of heated air at a temperature of about 230° F. until a final moisture content of six percent was reached.

The finished product consisted of eye appealing pieces having a pink to red color resembling cooked ham and having a taste closely resembling cooked ham. The finished product was found particularly well adapted to casserole type recipes. It was also found to have storage and hydration characteristics similar to the product of Example I.

EXAMPLE III

A quantity of 563.3 grams of granules of the type of example I was given a fruit flavor and color by hydrating with 127.5 percent of the batch weight (718.2 grams) of a solution comprised of:

| FD&C Red 02 | 0.2 gram |
|---|---|
| Sucrose | 321.7 grams |
| Citric Acid | 16.3 grams |
| Water | 380.0 grams |

The hydrated granules were then treated with 64 grams of 140° F. hydrogenated vegetable oil to inhibit sticking of granules and dried in an air stream at 200° F. to a moisture content of 8 percent. Thereafter a mixture of 28 grams granular sucrose and 6.3 grams powdered citric acid were blended with the treated granules; and the product was finished by absorbing 121 grams of a mixture of 14 grams oil soluble strawberry flavoring in hydrogenated vegetable oil heated to 140° F.

The final product was found pleasing to a panel of testers.

EXAMPLE IV

Another pleasant, simulated fruit product was prepared by proceeding, as in example III, with a batch of 603.3 grams soybean granules and hydrating same with 120.3 percent of the batchweight (725.7 grams) of a solution containing:

| Orange color blend | 0.1 gram |
|---|---|
| Sucrose | 312.0 grams |
| Citric Acid | 11.6 grams |
| Water | 402.0 grams |

This was followed by the addition of 78.2 grams hydrogenated vegetable oil whereupon the material was dried as in Example III. Thereafter the material was blended with 43.0 grams sucrose and 3.2 grams citric acid; and finally sprayed with 78.2 grams of hydrogenated vegetable oil containing 4.3 grams of oil soluble orange flavoring.

EXAMPLE V

Nut meats such as pecan and walnut have been simulated by dispersing oil soluble or miscible nut flavoring in heated hydrogenated vegetable oil and mixing with expanded granules of soybean protein of the type utilized in example I. Since an aqueous flavor solution is not employed, there is no need for further heating to reduce moisture level; and it has been found that if the oil is heated to 140°-160° F., a satisfactory product will result. According to taste and dietary preferences, about 1 to 2 percent flavoring, by weight of the protein material, is mixed with about 30 to 33 percent hydrogenated vegetable oil, by weight, and absorbed by the granules. Small amounts of aluminum lake color may also be dispersed in the oil. Specific batches of product were prepared utilizing 862.6 grams expanded soybean protein granules per batch and treating with 259.5 grams of mixtures of hydrogenated vegetable oil including 10 to 15 grams of nut flavoring.

EXAMPLE VI

Simulated coconut was prepared by first blending 240 grams of fine granular sucrose with 686 grams of expanded soybean protein granules of the type used in Example I. To this was added, by spraying, 208 grams of hydrogenated vegetable oil heated to 140° F. and containing 0.45 ml. of oil soluble coconut flavoring.

Obviously many modifications and variations of the invention as hereinbefore set forth may be made without departing from the spirit and scope thereof, and, therefore, only such limitations should be imposed as are indicated in the appended claims.

I claim:

1. An improved method for imparting flavor to expanded protein material to simulate a proteinaceous food product, said method comprising: dispersing throughout a quantity of relatively dry expanded protein material an aqueous solution of flavor ingredients to hydrate said material; then dispersing throughout said hydrated expanded protein material a liquified fat having a melting point within the range of 80° to 110° F.; and heating the expanded protein material containing said flavor ingredients and fat to a temperature of 120° F. to 180° F. for a period of time sufficient to adjust the final moisture content to about one to 10 percent of the final weight whereby to also develop a desired flavor in the fat.

2. The method of claim 1 wherein the flavor ingredients include 0 to 27 percent salt, by weight of the solution, for enhancement of flavor and the development of shelf stability.

3. The method of claim 1 wherein the flavor ingredients are absorbed in an amount to increase the weight of the dry protein materials by about 1 to 60 percent and the fat is absorbed in an amount of 5 to 60 percent by weight of the dry protein material.

4. The method of claim 1 wherein the aqueous solution of flavor materials comprises 0 to 20 percent hydrolyzed vegetable protein, 0 to 40 percent sugar, 0 to 27 percent salt, 0 to 3 percent citric acid, 0 to 3 percent ribotide, 40 percent to 90 percent water and small amounts of coloring additives and is applied to said expanded protein material in sufficient quantity and for sufficient time for said expanded protein material to take on an amount of solution equal to 20 percent to 150 percent of the dry weight of said material.

* * * * *